F. G. HUGHES.
ANTIFRICTION BEARING AND A PROCESS OF MANUFACTURING THE SAME.
APPLICATION FILED OCT. 12, 1916.
1,283,476. Patented July 17, 1917.
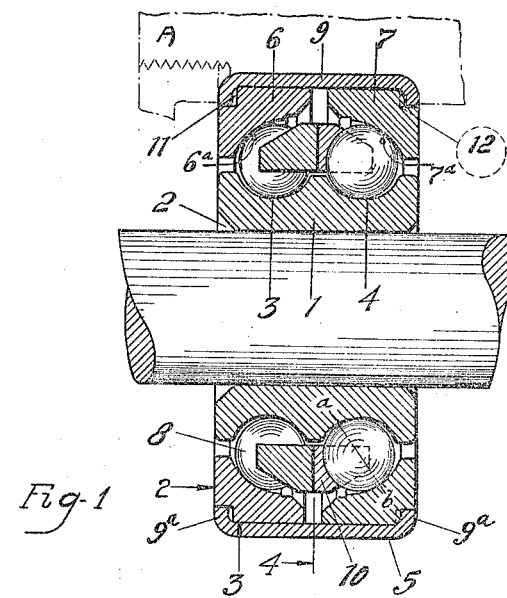
Fig-1
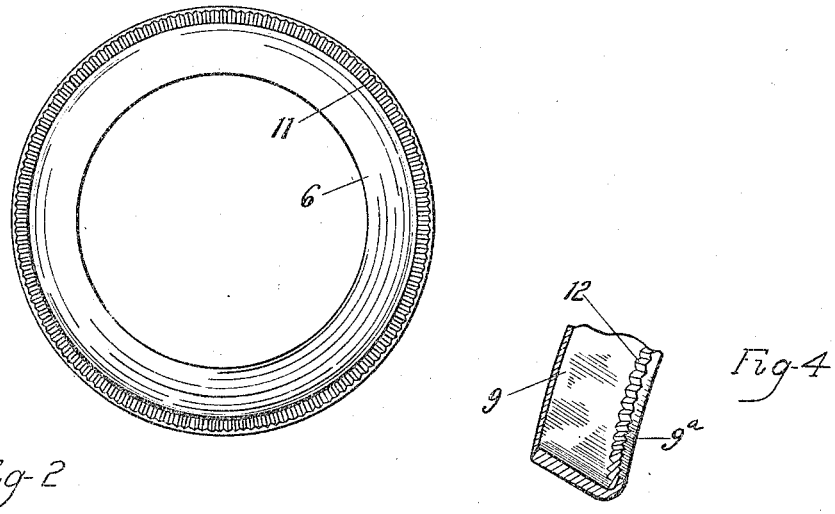
Fig-2
Fig-4
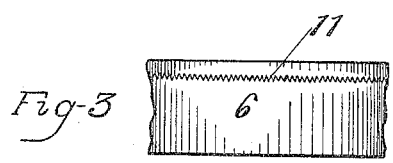
Fig-3
Frederick G. Hughes
INVENTOR.
BY James P. Moore
HIS ATTORNEY.

UNITED STATES PATENT OFFICE.

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

ANTIFRICTION-BEARING AND A PROCESS OF MANUFACTURING THE SAME.

1,233,476.  Specification of Letters Patent.  Patented July 17, 1917.

Application filed October 12, 1916. Serial No. 125,234.

*To all whom it may concern:*

Be it known that I, FREDERICK G. HUGHES, a citizen of the United States, residing at Bristol, county of Hartford, State of Connecticut, have invented a certain new and useful Antifriction-Bearing and a Process of Manufacturing the Same, of which the following is a full, clear, and exact description, such as will enable others skilled in the art to which it appertains to make and use the same, reference being had to the accompanying drawings, forming part of this specification.

My invention relates to antifriction bearings, and to processes of manufacturing the same.

One object is to provide a bearing having a race member composed of a plurality of assembled parts held accurately, rigidly and permanently in their proper relations, such bearing being of simple structure and of low cost of manufacture.

Another object is to provide a process of assembling and construction for use in the manufacture of antifriction bearings, particularly that above noted.

To these ends, and also to improve generally upon devices and processes of the character indicated, my invention consists in the following matters hereinafter described and claimed.

In the accompanying drawing

Figure 1 is a diametrical cross-sectional view of an annular double row ball bearing embodying my invention;

Fig. 2 is a view of one of the cup units, looking in the direction of the arrow 2 in Fig. 1;

Fig. 3 is a fragmental view of the cup unit illustrated in Fig. 2, looking in the direction of the arrow 3 in Fig. 1; and Fig. 4 is a fragmental perspective view of a portion of the shell unit of the bearing illustrated in Fig. 1, such portion being considered as cut out from the lower portion upon the diametrical section of Fig. 1 and upon the section line 4 of Fig. 1.

Without restricting my invention thereto I show and describe it with reference to a double row ball bearing of the type shown (in Fig. 1) and described in U. S. Patent 921,464, granted May 11, 1909, to A. F. Rockwell, and having a split separator of the type shown and described in U. S. Patent 1,105,132, granted July 28, 1914, to D. F. Graham.

Referring to the accompanying drawing, and to said patents, 1 indicates the inner race member, or cone, with a central shaft-receiving bore 2 and two like annular continuous and unbroken tracks 3 and 4 for the balls 8. 5 indicates, generally, the outer race member, or cup, comprising two annular cup units 6 and 7 held assembled by a smooth-bored cylindrical shell, or backer, unit 9 tightly receiving the smooth-peripheried cup units and radially bent, or flanged, inward at its ends $9^a$ to partially overlie the side faces of the cup units and hold the cup units and the balls assembled with the cone. Each cup unit is provided with a continuous and unbroken annular ball track, $6^a$ and $7^a$ respectively, opposite a respective cone ball track and coöperating therewith to provide a raceway for an annular series of a suitable number of the balls 8. The four ball tracks are each curved crosswise of the bearing upon a radius greater than that of the balls thereby to give a ball one point of contact only upon each track, the load lines being angular, as indicated by line *a—b*, and each series of balls and its tracks providing a two-point radial-and-thrust bearing. The balls of each series are spaced by one half of a split separator 10. The shell unit is a seamless single piece.

According to my invention I provide the outside radially extending face of each cup unit, at the portions where it contacts the inturned end of the shell unit, with a suitable number, as a complete annular series, of ribs 11. Also I provide the inside face of each inturned end $9^a$ with a number of ribs 12. These ribs 12 are preferably like, in character and number, the ribs 11 and they coöperate with, intimately mesh with, and closely fit, the ribs 11. The ribs 11 and 12, as illustrated, extend transverse the direction of the circular line of travel of the balls, as radially of the bearing. They anchor the cup units to the shell unit against any rotative travel or creeping with respect thereto. This prevents a cup unit being, by the traveling balls, dragged around the shell unit (held stationary in the housing A). Thus the anchoring prevents the wearing of the shell unit by a rotating cup unit, particularly along the radial contacting faces, and so prevents the loosening and wabbling of the cup units in the shell unit, the destroying of the initial accurate fit and adjustment of the parts, and the rapid destruction of the bearing.

I accomplish this desirable anchoring without the use of set screws, spring washers, inserted keys, and such additional and supplemental elements. Moreover I use no structure, such as mating screw threads on the cup units and shell unit, which would hinder the attaining of that accuracy of adjustment made easy, in the assembling of the bearing, by the smooth-bored shell, slid-in cup units and spun-over right hand edge of the shell unit.

The anchoring projections 11 may be formed with a nurling tool in any suitable size, arrangement and shape. I have found small substantially V-shaped, closely adjacent, ribs, extending substantially across the portions of the cup units in contact with the ends 9$^a$, and of substantially the size shown in Figs. 2 and 3, satisfactory for bearings of the various commercial sizes. In Figs. 1 and 4 the ribs 11 and 12 are, for clearness, exaggerated in size.

The bearing is preferably assembled by (1) forcing the (say) left hand (in Fig. 1) cup unit into the bore of the shell unit and against the flat, left hand, previously inturned end of the shell unit, by a straight-line movement from the right, (2) introducing the cone, the balls, and the separator, (3) forcing in the right hand cup unit by a straight-line movement and (4) spinning down the right hand end of the shell unit and thereby forcing it against the cup unit.

The shell unit is, generally, of comparatively soft steel and the cup units are of comparatively hard steel. So, in assembling in the above described manner, the ribs of the left hand cup unit are driven into the shell unit and thus form the ribs at the left end thereof. Also, when the right end of the shell unit is spun in it is forced between the ribs of the right hand cup unit and thus forms the ribs at the right hand end of the shell unit. Thus the operation of assembling provides the shell unit with its ribs and becomes, to that extent, a process of construction as well as a process of assembling.

It will be seen that I have provided a bearing of the character indicated whose parts are held rigidly and accurately in assembled position without complicated or expensive structure. It will also be seen that I have provided a simple and inexpensive process of assembling and construction for use in the manufacture of antifriction bearings, more particularly of the above described type.

Having thus described my invention, what I claim as new and desire to secure by Letters Patent, is

1. In an antifriction bearing, a pair of opposed race members each providing a track for antifriction members, and a series of antifriction members traveling upon said tracks; one of the race members comprising a backer unit and a track unit having a continuous and uninterrupted track, the backer unit extending crosswise of the bearing along a surface of the track unit and having an upstanding flange, and the track unit having a face in contact with the side face of said flange with both faces provided with integral, coöperating, and meshing anchoring projections located to prevent the travel of said track unit relative to said backer unit; substantially as described.

2. In an antifriction bearing, an inner and an outer annular race member each providing a track for antifriction members, and a series of antifriction members traveling upon said tracks; one of said race members comprising a shell unit and a track unit having a continuous and uninterrupted track, one of said units having a bore receiving the other, the shell unit extending crosswise of the bearing along a periphery of the track unit and having a radially extending flange, and the track unit having a radially extending face in contact with said flange with said face and flange each provided with integral, coöperating, and meshing anchoring projections located to prevent the rotative travel of said track unit relative to said shell unit; substantially as described.

3. In an antifriction bearing, an inner and an outer race member each provided with a pair of tracks for antifriction members and opposing the tracks of the other, and a pair of series of antifriction members traveling upon said tracks; one said race member comprising a smooth-bored cylindrical shell unit upturned at its ends to provide radially extending flanges, and also comprising a pair of smooth-peripheried track units received in said shell unit and each having a radially extending face in contact with a mating face of a flange, the mating faces being provided with integral meshing anchoring projections located to prevent the rotative travel of the track units relative to said shell unit; substantially as described.

4. In the manufacture of antifriction bearings comprising a built-up race member including a track unit element, assembled with a backer unit having a flange element, the track unit element being anchored to the backer unit at the flange element by anchoring projections: the process of (1) providing one said element with an anchoring projection, and (2) assembling the track unit element with the backer unit and at the same time forcing the track unit element and the flange element into intimate contact and the said anchoring projection of the one element into the other element to provide such other element with projections coöperating with the first named projection; substantially as described.

5. In the manufacture of antifriction bearings comprising a built-up race member including two track units each with an anchoring projection, and also including a shell unit having initially one flange and finally two flanges, the track units being assembled with the shell unit and being anchored to the flanges of the shell unit by the anchoring projections upon the track units; the process of (1) assembling one track unit with the shell unit and at the same time forcing the anchoring projection of such track unit into the initial flange of the shell unit to provide such flange with projections coöperating with the projection of the track unit, (2) bringing the other track unit into assembled relation with the shell unit and the first named track unit, and (3) forming the final flange upon the shell unit and at the same time forcing such flange against the anchoring projection of the second named track unit to provide such flange with projections coöperating with the projection of such track unit; substantially as described.

In testimony whereof I hereunto affix my signature.

FREDERICK G. HUGHES.